United States Patent
Hahnlen et al.

(10) Patent No.: US 11,344,966 B2
(45) Date of Patent: May 31, 2022

(54) UAM RESISTANCE SPOT WELD JOINT TRANSITION FOR MULTIMATERIAL AUTOMOTIVE STRUCTURES

(71) Applicants: Honda Motor Co., Ltd., Tokyo (JP); Ohio State Innovation Foundation, Columbus, OH (US)

(72) Inventors: Ryan M. Hahnlen, Dublin, OH (US); Marcelo J. Dapino, Columbus, OH (US); Leon M. Headings, Columbus, OH (US); Mark Bryant Gingerich, Columbus, OH (US)

(73) Assignees: HONDA MOTOR CO., LTD., Tokyo (JP); OHIO STATE INNOVATION FOUNDATION, Columbus, OH (US)

( * ) Notice: Subject to any disclaimer, the term of this patent is extended or adjusted under 35 U.S.C. 154(b) by 224 days.

(21) Appl. No.: 16/737,234

(22) Filed: Jan. 8, 2020

(65) Prior Publication Data
US 2020/0139482 A1 May 7, 2020

Related U.S. Application Data

(63) Continuation of application No. 15/689,095, filed on Aug. 29, 2017, now Pat. No. 10,532,421.

(51) Int. Cl.
*B62D 25/02* (2006.01)
*B62D 25/06* (2006.01)
(Continued)

(52) U.S. Cl.
CPC ............. *B23K 11/20* (2013.01); *B23K 11/11* (2013.01); *B23K 20/10* (2013.01); *B62D 25/02* (2013.01);
(Continued)

(58) Field of Classification Search
CPC .... B62D 25/02; B62D 25/06; B62D 25/2036; B62D 27/02; B62D 29/007; B62D 29/008;
(Continued)

(56) References Cited

U.S. PATENT DOCUMENTS

| 2,481,614 A | 9/1949 | Thomas |
| 3,663,356 A | 5/1972 | Li |

(Continued)

FOREIGN PATENT DOCUMENTS

| CN | 102107535 | 6/2011 |
| CN | 102672328 | 9/2012 |

(Continued)

OTHER PUBLICATIONS

Office Action of U.S. Appl. No. 16/058,440 dated Oct. 6, 2021, 16 pages.
(Continued)

*Primary Examiner* — Gregory A Blankenship
(74) *Attorney, Agent, or Firm* — Rankin, Hill & Clark LLP

(57) ABSTRACT

A vehicle body assembly is described herein, including a first structural component and a second structural component. The first structural component may be a roof component or a side panel, and include a first part including a first metal and a second part including a second metal different than the first metal. The second part is formed on a peripheral edge portion of the first part and defines a mounting flange for the first structural component. The second part is joined to the first part via an ultrasonic additive manufacturing (UAM) interface. The second structural component is including the second metal and is joined to the second part at the mounting flange via a resistance spot weld (RSW) joint.

20 Claims, 8 Drawing Sheets

(51) Int. Cl.
*B62D 25/20* (2006.01)
*B62D 27/02* (2006.01)
*B62D 29/00* (2006.01)
*B23K 11/11* (2006.01)
*B23K 11/20* (2006.01)
*B23K 20/10* (2006.01)
*B23K 101/00* (2006.01)
*B23K 103/20* (2006.01)

(52) U.S. Cl.
CPC ......... *B62D 25/06* (2013.01); *B62D 25/2036* (2013.01); *B62D 27/02* (2013.01); *B23K 2101/006* (2018.08); *B23K 2103/20* (2018.08); *B60Y 2304/03* (2013.01); *B60Y 2304/05* (2013.01); *B60Y 2410/124* (2013.01); *B62D 29/007* (2013.01); *B62D 29/008* (2013.01)

(58) Field of Classification Search
CPC ......... B23K 11/10; B23K 11/11; B23K 23/10; B23K 2101/006; B23K 11/20; B23K 20/10
See application file for complete search history.

(56) References Cited

U.S. PATENT DOCUMENTS

| | | | |
|---|---|---|---|
| 4,890,784 | A | 1/1990 | Bampton |
| 5,322,205 | A | 6/1994 | Kato et al. |
| 5,599,467 | A | 2/1997 | Okabe et al. |
| 6,173,886 | B1 | 1/2001 | McCay et al. |
| 6,558,491 | B2 | 5/2003 | Jahn et al. |
| 6,833,199 | B2 | 12/2004 | Fujita et al. |
| 6,988,757 | B2 | 1/2006 | McLaren et al. |
| 7,115,324 | B1 | 10/2006 | Stol et al. |
| 7,829,165 | B2 | 11/2010 | Grandominico et al. |
| 8,020,749 | B2 | 9/2011 | Kobayashi et al. |
| 8,082,966 | B2 | 12/2011 | Short |
| 8,221,899 | B2 | 7/2012 | Takeda et al. |
| 8,262,968 | B2 | 9/2012 | Smith et al. |
| 8,337,998 | B2 | 12/2012 | Takeda et al. |
| 8,487,206 | B2 | 7/2013 | Urushihara et al. |
| 8,640,320 | B2 | 2/2014 | Carsley et al. |
| 8,647,453 | B2 | 2/2014 | Doorbar |
| 9,101,979 | B2 | 8/2015 | Hofmann et al. |
| 9,126,632 | B2* | 9/2015 | Ono ............... B62D 25/06 |
| 9,174,298 | B2 | 11/2015 | Kasukawa et al. |
| 9,446,475 | B2 | 9/2016 | Norfolk et al. |
| 9,564,385 | B2 | 2/2017 | Schmit et al. |
| 10,843,741 | B2* | 11/2020 | Nakamoto ......... B62D 25/04 |
| 10,870,166 | B2* | 12/2020 | Hahnlen ............ B32B 15/012 |
| 10,894,566 | B2* | 1/2021 | Lang ................ B62D 27/02 |
| 2002/0112435 | A1 | 8/2002 | Hartman |
| 2006/0165884 | A1 | 7/2006 | White et al. |
| 2009/0011269 | A1 | 1/2009 | Urushihara et al. |
| 2009/0117366 | A1 | 5/2009 | Honma |
| 2010/0141009 | A1 | 6/2010 | Kirch et al. |
| 2012/0183802 | A1 | 7/2012 | Bruck |
| 2013/0309520 | A1* | 11/2013 | Lang ................ B32B 15/01 428/594 |
| 2014/0193659 | A1 | 7/2014 | Lanzerath et al. |
| 2015/0050453 | A1 | 2/2015 | Carson, Jr. et al. |
| 2015/0217395 | A1 | 8/2015 | Spinella et al. |
| 2015/0352661 | A1 | 12/2015 | Karlen et al. |
| 2016/0028216 | A1 | 1/2016 | Pal |
| 2016/0045978 | A1* | 2/2016 | Wang ............... B23K 20/10 219/91.2 |
| 2016/0091125 | A1 | 3/2016 | Lockwood et al. |
| 2016/0101599 | A1 | 4/2016 | Kaiser et al. |
| 2016/0200074 | A1 | 7/2016 | Lang et al. |
| 2017/0008333 | A1 | 1/2017 | Mason et al. |
| 2017/0057005 | A1* | 3/2017 | Wisniewski ......... B23K 20/227 |
| 2017/0286821 | A1 | 10/2017 | Nardi et al. |
| 2017/0287685 | A1 | 10/2017 | Ferrasse et al. |
| 2018/0058327 | A1 | 3/2018 | Tajiri et al. |
| 2018/0058473 | A1 | 3/2018 | Kenworthy et al. |
| 2018/0222150 | A1* | 8/2018 | Petrucci .................. B32B 7/05 |
| 2018/0346034 | A1 | 12/2018 | Sheldon et al. |
| 2018/0361481 | A1 | 12/2018 | Tenhaeff |
| 2019/0033719 | A1 | 1/2019 | Cole |
| 2019/0047031 | A1 | 2/2019 | Hahnlen et al. |
| 2019/0061032 | A1* | 2/2019 | Wolcott ............. B23K 11/252 |
| 2019/0061042 | A1* | 2/2019 | Hahnlen ............ B62D 27/02 |
| 2020/0139480 | A1* | 5/2020 | Sigler ................ B23K 11/115 |
| 2021/0173475 | A1* | 6/2021 | Qian ................. G06F 3/04842 |
| 2021/0197457 | A1* | 7/2021 | Broach ............. B29C 64/165 |
| 2021/0276126 | A1* | 9/2021 | Chen .................. B23K 9/02 |
| 2021/0309304 | A1* | 10/2021 | Mueller .......... B29C 45/14819 |

FOREIGN PATENT DOCUMENTS

| | | |
|---|---|---|
| CN | 103551721 | 2/2014 |
| CN | 104400204 | 3/2015 |
| CN | 105689906 | 6/2016 |
| EP | 0955121 | 11/1999 |
| EP | 2754546 | 7/2014 |
| JP | 2005199327 | 7/2005 |
| WO | WO2012036262 | 2/2014 |
| WO | 2015166149 | 11/2015 |

OTHER PUBLICATIONS

Notice of Allowance of U.S. Appl. No. 15/885,895 dated Aug. 18, 2020, 10 pages.
Davies et al., "Characterizing Al Tailor-Welded Blanks for Automotive Applications", JOM, Nov. 1999, 5 pages.
Patel et al., "Ultrasonic Spot Welding of Aluminum to High-Strength Low-Alloy Steel: Microstructure, Tensile and Fatigue Properties", Metallurgical and Materials Transactions A, Mar. 2014, 13 pages.
Office Action of U.S. Appl. No. 16/058,440 dated Jan. 11, 2021, 29 pages.
Office Action of U.S. Appl. No. 17/124,859 dated Sep. 1, 2021, 22 pages.
Office Action of U.S. Appl. No. 16/058,440 dated May 14, 2021, 13 pages.
Office Action of U.S. Appl. No. 15/885,895 dated Jan. 6, 2020, 21 pages.
"Driving higher strength and lower weights" Fabrisonic, http://fabrisonic.com/metal-matrix-composites/ (Accessed Mar. 9, 2015).
Friel et al. "Ultrasonic Additive Manufacturing—a hybrid production process for novel functional products" SciVerse Science Direct, 35-40, 2013.
Graff. "Ultrasonic Additive Manufacturing", ASM Handbook: vol. 6A, Welding Fundamentals and Processes, 2011, 22 pages.
Ryabov, "Fusion Welding of Aluminum to Steel", Foreign Technology Dvision Wright-Patterson Air Force Base, Ohio, Jul. 9, 1973, 236 pages.
"Ultrasonic Additive Manufacturing presentation at ASM Symposium" https://ewi.org/ultrasonic-additive-manufacturing-presentation-at-asm-symposium/. Printed Aug. 28, 2017.
Wolcott et al. "Characterisation of Al—Ti dissimilar material joints fabricated using ultrasonic additive manufacturing" Sci & Tech of Welding & Joining, 2016, vol. 21, pp. 114-123.
Wolcott et al. "Ultrasonic additive manufacturing", Additive Manufacturing Handbook—Product Development for the Defense Industry, 2017, Chapter 17, pp. 275-313.
Yang "Fabrication of Long-Fiber-Reinforced Metal Matrix Composites Using Ultrasonic Consolidation" Utah State University, 2008.
Notice of Allowance of U.S. Appl. No. 17/124,859 dated Nov. 16, 2021, 15 pages.
Office Action of U.S. Appl. No. 17/018,289 dated Dec. 16, 2021, 42 pages.
Notice of Allowance of U.S. Appl. No. 16/058,440 dated Feb. 16, 2022, 22 pages.

* cited by examiner

UAM RESISTANCE SPOT WELD JOINT TRANSITION FOR MULTIMATERIAL AUTOMOTIVE STRUCTURES

CROSS REFERENCE TO RELATED APPLICATION

This application is a continuation of U.S. application Ser. No. 15/689,095 filed Aug. 29, 2017, which is expressly incorporated herein by reference.

BACKGROUND

Joining of dissimilar metals in the automotive industry is typically accomplished through the use of adhesives or mechanical fasteners. However, mechanical fasteners require added weight, cost, parts, and assembly time. Adhesives require specialized equipment, increased takt time, and a separate thermal cycle to cure the adhesive to full strength. Changing to a different joining process often requires new infrastructure in factory assembly lines, costing additional capital investment, line re-design, and personnel training.

BRIEF DESCRIPTION

According to one or more aspects, a multi-material component includes a first component including a first material, a second component including a second material that is different than the first material, and an insert positioned between the first component and the second component. The insert is joined to the first component via an ultrasonic additive manufacturing (UAM) interface and the second component is secured to the insert.

The insert can include a plurality of UAM layers. The second component can be resistance spot welded (RSW) to the insert via a RSW joint. A thickness of the insert can be based on the RSW joint being formed to exclude any portion of the UAM interface or based on the RSW joint being formed to include a portion of the UAM interface in a Heat Affected Zone (HAZ). The UAM interface can run along a length of the first component and the insert in a forward and rearward direction or in a lateral direction of a vehicle body. The insert can be secured to the first component at a peripheral edge portion of the first component and define a mounting flange to which the second component is secured.

According to one or more aspects, a method for manufacturing a multi-material component can include providing a first component comprising a first material, providing an insert comprising a second material that is different than the first material, joining the insert to the first component via an ultrasonic additive manufacturing (UAM) interface, providing a second component comprising the second material, and joining the second component to the insert. Joining the second component to the insert can include resistance spot welding (RSW) the second component to the insert via a RSW joint. Joining the second component to the insert can include forming the RSW joint to include a portion of the UAM interface in a Heat Affected Zone (HAZ). Joining the second component to the insert can include forming the RSW joint to exclude any portion of the UAM interface. A thickness of the insert can be based on the RSW joint being formed to include or exclude a portion of the UAM interface. The first material can be an aluminum or aluminum-based alloy and the second material can be a steel or steel-based alloy. The first component can be a roof component or a side panel and the second component can be a vehicle body component.

According to one or more aspects, a vehicle body assembly can include a first structural component and a second structural component. The first structural component can include a first part including a first material and a second part including a second material different than the first material. The second part can be formed on a peripheral edge portion of the first part and can define a mounting flange for the first structural component. The second part can be joined to the first part via an ultrasonic additive manufacturing (UAM) interface. The second structural component can include the second material. The second structural component can be joined to the second part at the mounting flange via a resistance spot weld (RSW) joint.

The first material can be an aluminum or aluminum-based alloy and the second material can be a steel or steel-based alloy. The first structural component can be a roof component or a side panel. A thickness of the second part can be based on the RSW joint or associated Heat Affected Zone (HAZ) including or excluding a portion of the UAM interface. The UAM interface can run along a length of the first part and the second part in a forward and rearward direction or a lateral direction of the vehicle body assembly. The UAM interface can be located at a position corresponding to a region to be welded by resistance spot welding.

DETAILED DESCRIPTION

It should be understood that the description and drawings herein are merely illustrative and that various modifications and changes can be made in the structures disclosed without departing from the present disclosure. As used herein, lateral directions are transverse across the vehicle body, i.e., the left and right directions. Likewise, longitudinal directions refer to forward and rearward directions of the vehicle body, and the vertical directions relate to elevation, i.e., the upward and downward directions.

Figure 1:
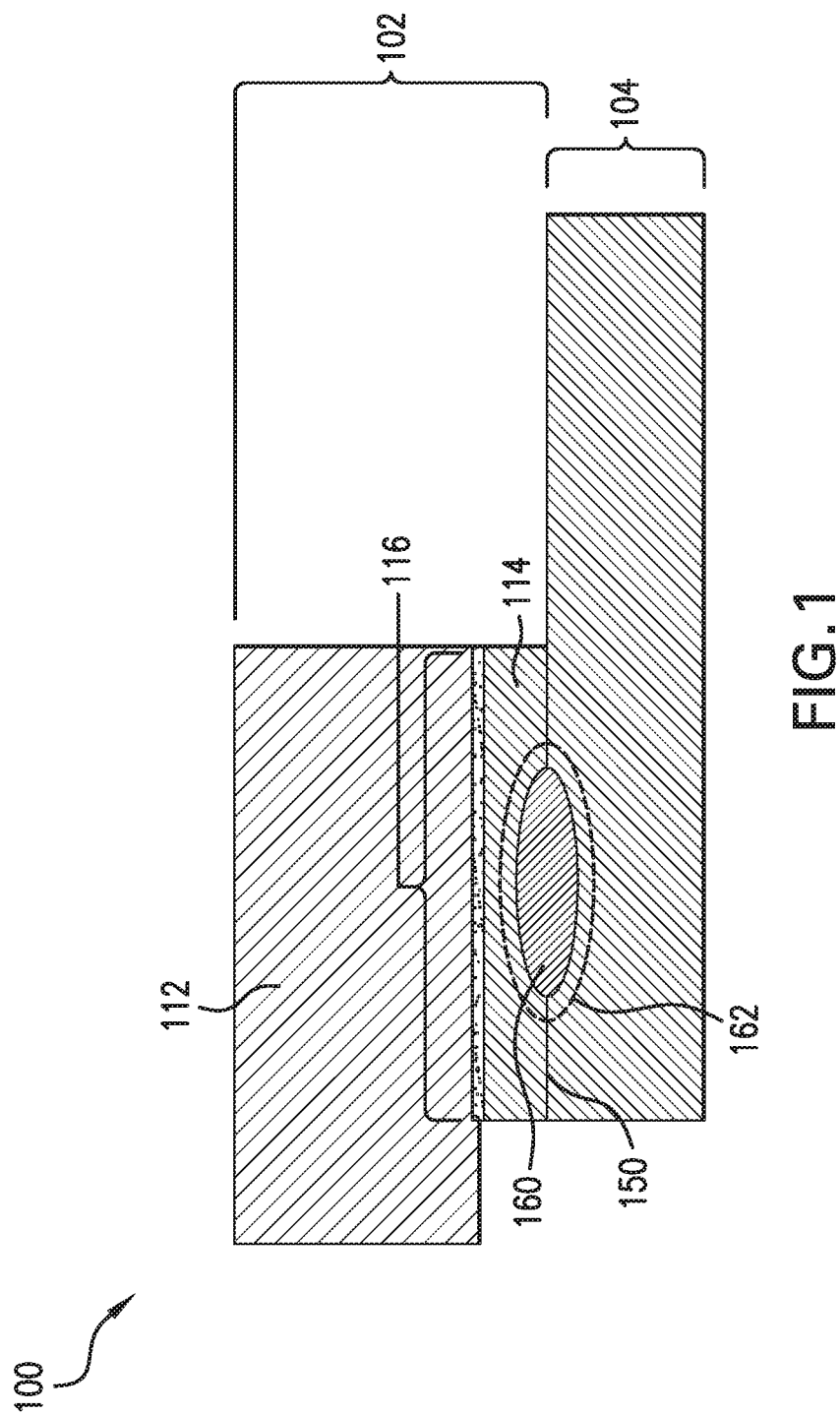
FIG. 1 is an exemplary schematic view of a vehicle body assembly including a first structural component having an ultrasonic additive manufacturing (UAM) interface attached to a second structural component.

FIG. 1 is an exemplary schematic view of a vehicle body assembly 100 including a first structural component 102 attached to a second structural component 104. According to one aspect of the vehicle body assembly 100, the first structural component 102 is a roof component 110 (e.g., as will be described in FIGS. 2-5). Although the first structural component 102 is described as the roof component 110 herein, it should be appreciated that other embodiments are contemplated where the first structural component 102 is a side panel component, and the second structural component 104 is a structural pillar, for example.

According to the present disclosure, the roof component 110 includes a first part 112 (e.g., a first component) comprising a first metal or material and a second part 114 (e.g., an insert) comprising a second metal or material different than the first metal. The first part 112 can be a roof panel or skin formed of aluminum or an aluminum alloy, for example. The second part 114 can be a sheet metal blank comprising steel or a steel alloy. In one or more aspects, shown in FIG. 6, the second part 114 or insert can include a plurality of UAM layers which are formed by overlapping or stacking foil tapes 114' to create a UAM block build configuration for the second part 114 or the insert. The foil tapes 114' generally have a predetermined thickness, such as 150 microns, for example. In this regard, multiple layers of foil tapes 114' can be stacked on one another to form the insert or the second part 114 to have a thickness as desired.

The first part 112 is joined to the second part 114 using an ultrasonic additive manufacturing (UAM) welding process, thereby creating a UAM interface 116 between the first part 112 and the second part 114. In the example where the second part 114 comprises a steel or steel alloy, the second part 114 defines a substrate during the UAM welding process, allowing the first part 112 to be formed of a metal that is UAM weld compatible with the substrate. Examples of such metals include aluminum (Al), magnesium (Mg), Al-based alloys (e.g., 5000, 6000, and 7000 series aluminum alloys), Mg alloys, steels (e.g., mild steels, dual phase steels, cold formed steels), etc. In any event, the first part 112 and the second part 114 are formed of first and second materials, metals, or metal alloys which are UAM weld compatible with each other.

In this way, the roof component 110 is a multi-material component which includes a region where two dissimilar materials are joined with the UAM interface 116. The UAM interface 116 is a solid-state metal weld interface where thermally sensitive materials and/or otherwise dissimilar materials are joined to each other through clean metal-metal contact and metallic bonding. As such, the roof component 110 can be formed by joining the first part 112 comprising the first metal to the second part 114 comprising the second metal at a peripheral edge portion of the first part 112 via the UAM welding process. It should be noted however, that the second part 114 can be secured to any portion of the first part 112 (and not just the peripheral edge portions) via the UAM welding process and joined with the UAM interface 116, thereby enabling the second part 114 to act as a welding pad or insert which enables formation of a multi-material component. In this way, the UAM interface 116 is part of a load path that transfers forces and moments from the first part 112 to the second part 114 and from the second part 114 to the first part 112.

According to one aspect of the vehicle body assembly 100, the second structural component 104 is a vehicle body component 120 (as will be described in FIGS. 2-5). The second part 114 defines a mounting flange 150 for the roof component 110, which is ultimately joined to the vehicle body component 120 (e.g., a second component), as will be discussed below, thereby enabling an aluminum structural component to be attached to a steel structural component, via a steel transition (e.g., the second part 114) during assembly of the vehicle body assembly 100. Stated another way, the mounting flange 150 of the roof component 110 is defined by the steel-Al joint of the roof component 110. Because UAM is a solid state process, no degradation of any of the materials of the first part 112 or the second part 114 occur. Further, no intermetallics (which are often brittle and are undesirable as joints) are formed between the different metals of the first part 112 and the second part 114, enabling the joining of the roof component 110 (e.g., via the mounting flange 150) and the vehicle body component 120. In this way, the vehicle body assembly 100 can be a multi-material component including the first part 112 (as the first component including the first material or metal), the second structural component 104 (as the second component including the second material or metal), and the second part 114 (as the insert including the second material or metal).

The vehicle body component 120 includes the second metal (e.g., for a steel substrate, the vehicle body component 120 is a monolithic piece formed of steel or a steel-based alloy). Because the vehicle body component 120 and the second part 114 of the roof component 110 are formed of a common or similar metals (e.g., soluble with each other), resistance spot welding (RSW) can be used to join the mounting flange of the roof component 110 and the vehicle body component 120. In other words, the roof component 110, on a mating side, includes the second part 114 comprising steel, which enables RSW to be used to join the mating side of the roof component 110 to other components, such as the vehicle body component 120. Stated another way, RSW can be utilized because the UAM interface 116 between the aluminum of the roof skin and the steel of the second part 114 (e.g., of the mounting flange 150) provides intimate metal to metal contact between the two compatible metals, which results in a solid-state joining of the first part 112 to the second part 114 and offers a relatively low electrical resistance.

Although the roof component 110 (e.g., the first component) is described as being secured to the vehicle body component 120 (e.g., the second component) using RSW, other types of securing are contemplated, such as rivets, structural adhesives, other fusion and solid-state welding processes, nuts and bolts, screws, etc.

By contrast to the UAM interface 116, the steel-steel interface between the roof component 110 and the vehicle body component 120 is not bonded (prior to the RSW) and has a relatively high electrical resistance. As such, when current is applied during the RSW process, a steel-steel weld or a RSW joint 160 interface is created because the steel-steel interface is heated through resistive heating and pressure applied. Therefore, an assembly line can be configured to assemble or attach the roof component 110 to the vehicle body component 120 using existing general welders provided at welding factories in the assembly line.

The second part 114 can, in some embodiments, have a thickness such that the heat created from the RSW within a Heat Affected Zone (HAZ) 162 does not significantly impact the UAM interface 116 between the first part 112 and the second part 114. For example, the thickness of the second part 114 can be in the range of 0.15 mm to 2-3 mm, to mitigate excess heating of the UAM interface 116. As another example, the thickness of the second part 114 can be greater than a threshold thickness associated with excess heating of the UAM interface 116 which can create intermetallics between the first metal and the second metal. In other words, the thickness of the second part 114 has a sufficient thickness to mitigate heating to the UAM interface 116 or to mitigate significant heat from reaching the first part 112. In other embodiments, the second part 114 has a thickness less than the threshold thickness, resulting in a RSW joint or HAZ 162 which includes a portion of the UAM interface 116 (not shown in FIG. 1) for the purpose of thermomechanically modifying the microstructure of the UAM interface 116 and/or the first part 112. In other embodiments, the RSW joint occupies the area of 162 which includes the portion of the UAM interface 116.

In one or more embodiments, the second part 114 is joined to the first part 112 along a continuous UAM interface 116 which runs along the length (e.g., in the forward and rearward directions or the longitudinal direction of the vehicle body) of both the first part 112 and the second part 114. Further, in other embodiments, the roof component 110 can be configured to include the second part 114 joined to the first part 112 (using the UAM interface 116) merely at a region which is to be welded by RSW, thereby eliminating extra material and reducing the weight of the roof component 110.

Thus, when the roof component 110 includes the UAM interface 116 joining the second part 114 formed of the second metal (which is common to the metal of the vehicle body component 120), existing RSW equipment can be used to join the roof component 110 to the vehicle body component 120. In this way, UAM and then RSW can be used to create or join a multi-material structural component to an opposing homogenous material structure. As such, the vehicle body assembly 100 (including the roof component 110 and the vehicle body component 120) can be assembled through known vehicle assembly lines without any requirement for re-tooling or additional capital investment. The vehicle body assembly 100 can be e-coated and subjected to painting processes (not shown), including curing or baking paint applied to the vehicle body assembly 100.

Figure 2:
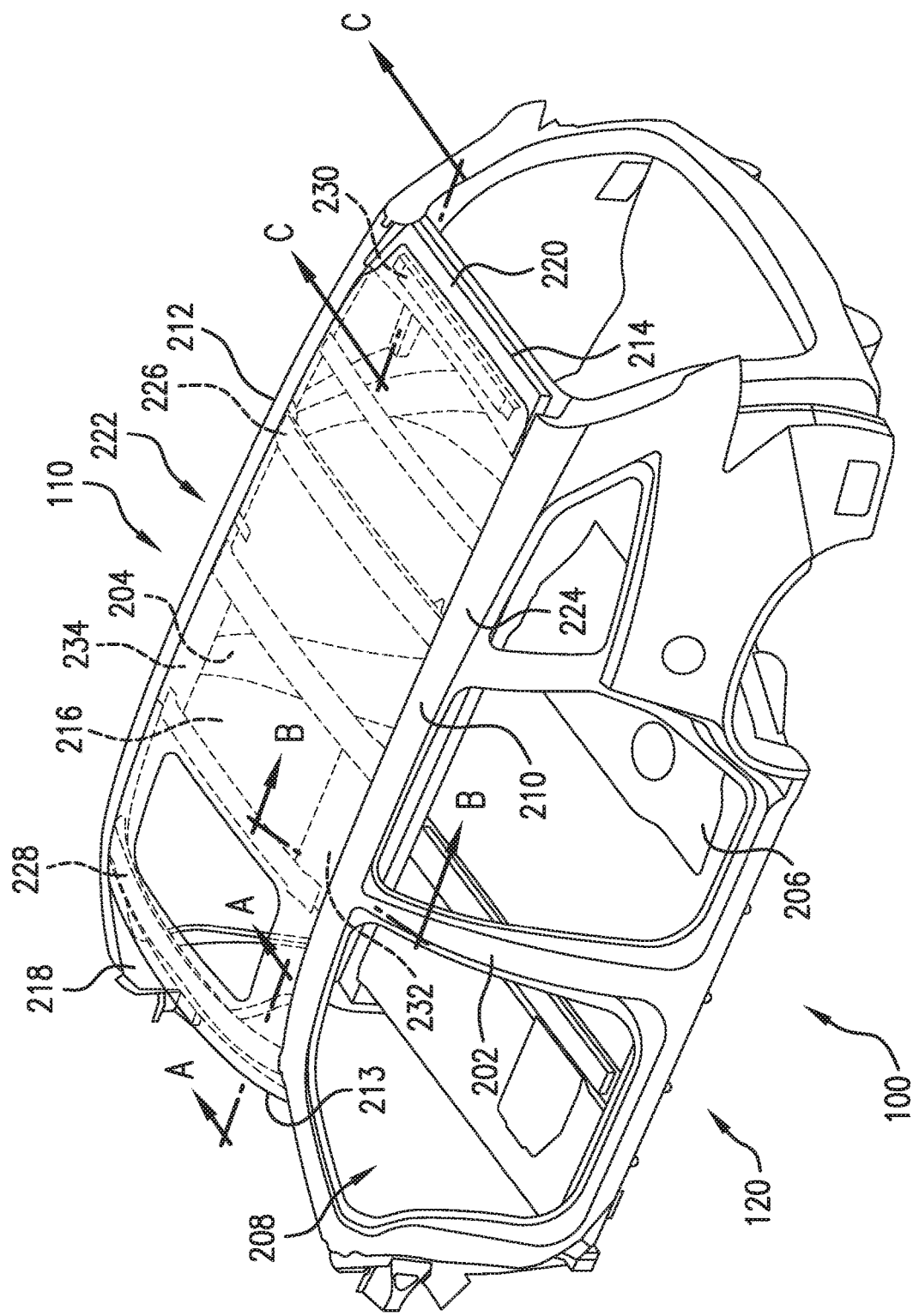
FIG. 2 is a perspective view of a vehicle body assembly including a roof component (i.e., the first structural component) secured to the vehicle body component (i.e., the second structural component).

FIG. 2 is a perspective view of the vehicle body assembly 100 including the roof component 110 (i.e., the first structural component 102) secured to the vehicle body component 120 (i.e., the second structural component 104). The roof component 110 and the vehicle body component 120 will now be described in greater detail. The vehicle body component 120 can be formed of a pair of laterally spaced body members or side panels 202, 204 and a floor panel 206, which together define a passenger compartment 208. The side panels 202, 204 can be identically constructed, but for their disposition on opposite sides of the vehicle body assembly 100, and each side panel 202, 204 can define a respective longitudinal extending side roof rail 210, 212. A front roof rail 213 and a rear roof rail 214 span laterally between the side panels 202, 204. At least one cross member or roof bow can be interposed between the front and rear roof rails 213, 214 and can extend between the side panels 202, 204. The side panels 202, 204 together with the front and rear roof rails 213, 214 support the roof component 110 above the passenger compartment 208.

As previously discussed, the roof component 110 includes the first part 112 formed of the first metal and the second part 114 formed of the second metal, which is different than the first metal. According to one aspect, the first part 112 is an aluminum or aluminum-based alloy roof panel 216 which overlies the passenger compartment 208. As previously discussed, the second part 114 can be the steel transition which is UAM welded to the first part 112 (i.e., the roof panel 216 in this example, as will be described in FIGS. 3-5). The roof panel 216 is generally rectangular in plan view, but because individual vehicle roof components are required to conform to vehicle styling, the roof panel 216 can have alternative shapes. The roof panel 216 includes a forward end portion 218, a rearward end portion 220 and opposite side portions 222, 224 which extend longitudinally between the forward and rearward end portions. The roof component 110 further includes at least one roof stiffener 226. In the illustrated aspect, the roof stiffener 226 can extend laterally across the roof panel 216 between the side portions 222, 224.

Front and rear support brackets 228, 230 and side brackets 232, 234 can be secured to the roof component 110. The front and rear support brackets 228, 230 also extend laterally across the roof panel 216 between the side portions 222, 224. The side brackets 232, 234 extend longitudinally on the roof panel 216 between the front support bracket 228, the roof stiffener 226, and the rear support bracket 230. As depicted, each support bracket is separate from the second part 114 of the roof component 110 and is welded thereto to facilitate attachment of the roof component 110 and vehicle body component 120. The support brackets of the roof component 110 can also be formed of an aluminum or aluminum-based alloy.

Figure 3:
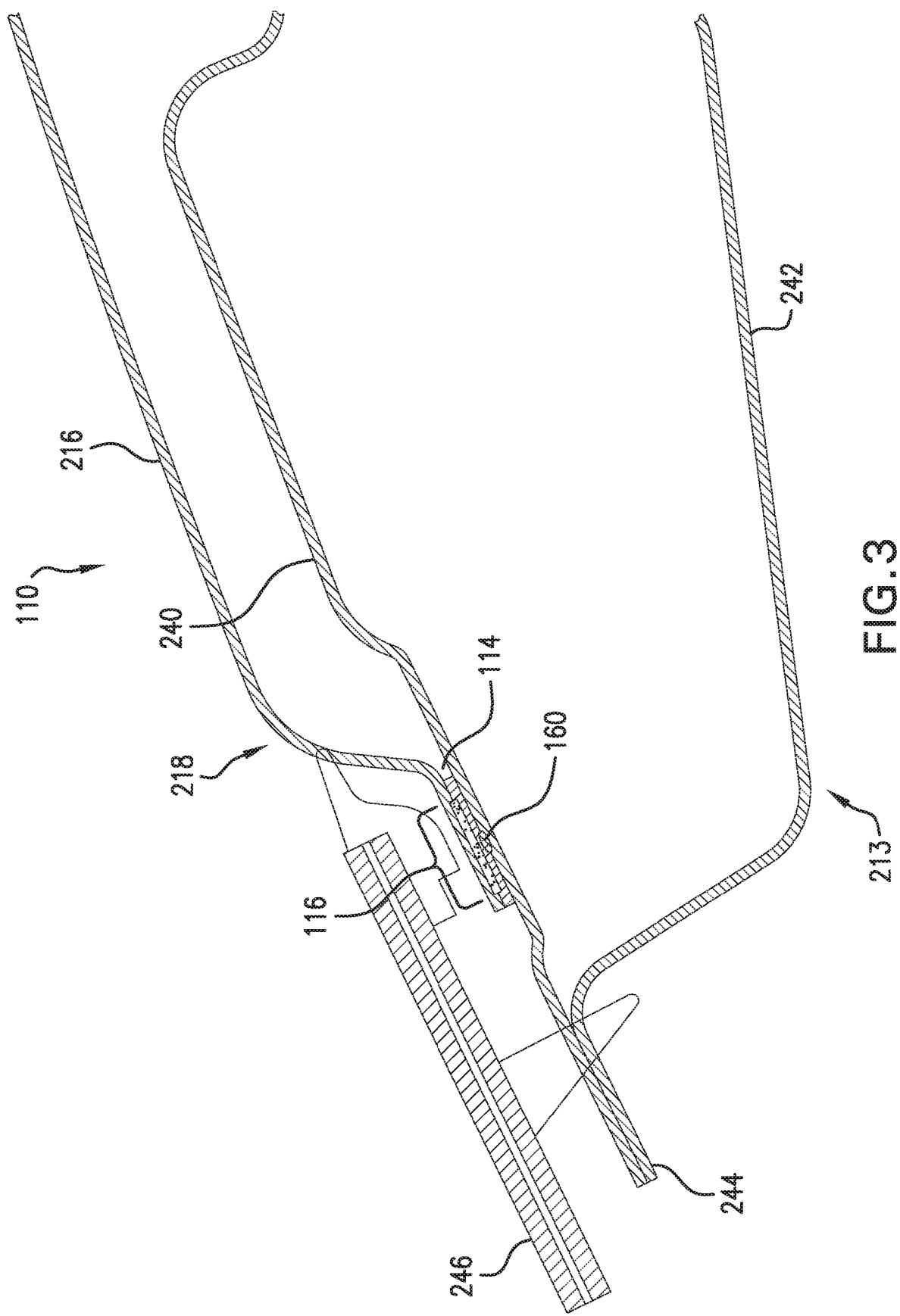
FIG. 3 is a cross sectional view taken along line A-A of FIG. 2.

FIG. 3 is a cross sectional view taken along line A-A of FIG. 2. The roof component 110 includes the roof panel 216 (as the first part 112) joined to the second part 114, which is a steel interface, via the UAM interface 116. The front roof rail 213 is connected to the forward end portion 218 of the roof component 110 via the RSW joint 160. The front roof rail 213 includes an outer panel 240 and an inner panel 242 that is fixedly attached (e.g., welded) to the outer panel 240 as seen at 244. A windshield 246 is adhered or bonded to a flange structure of the front roof rail 213. A reinforcement (not shown) can be interposed between the outer and inner panels 240, 242.

Figure 4:
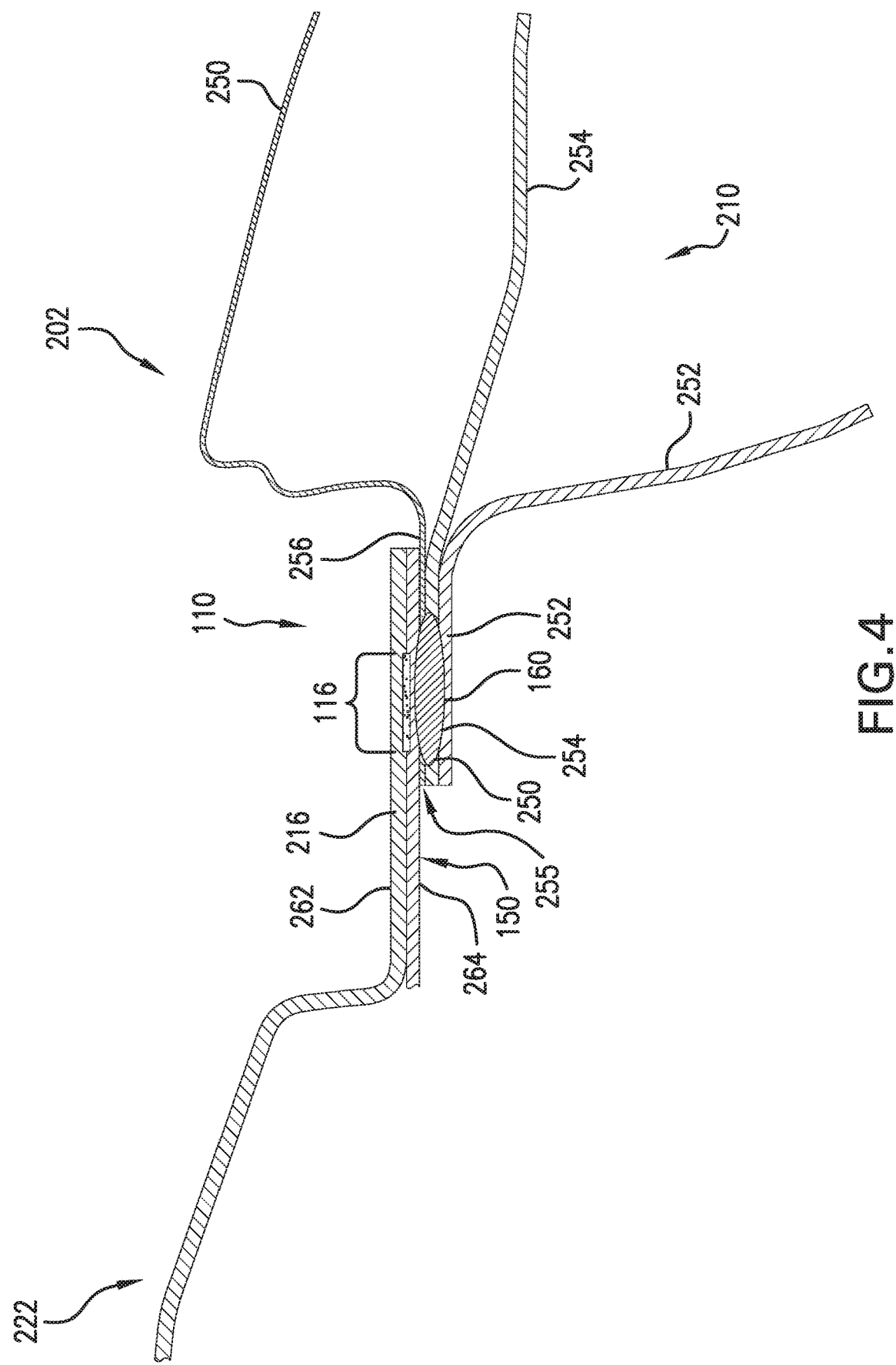
FIG. 4 is a cross sectional view taken along line B-B of FIG. 2.

FIG. 4 is a cross sectional view taken along line B-B of FIG. 2. In FIG. 4, the side roof rail 210 of the side panel 202 is connected to the side portion 222 of the roof component 110 via the RSW joint 160. To simplify the explanation of the present disclosure, only the construction of the side panel 202 and its connection to the roof component 110 will be discussed, but it should be understood that the other side panel 204 can have the same construction with a similar connection to the roof component 110.

The side roof rail 210 includes an outer panel 250 and an inner panel 252 that is fixedly attached (e.g., welded) to the outer panel. A reinforcement 254 can be interposed between the outer and inner panels 250, 252 in some embodiments. The side roof rail 210 includes a mounting flange 255 defined by the outer panel 250. In the depicted aspect, the mounting flange 255 of the side roof rail 210 defines a side section 256. The side portion 222 of the roof panel 216 includes a wall 262 joined to a section 264 having the mounting flange 150. The mounting flange 150 of the roof panel 216 overlies the mounting flange 255 of the side roof rail 210, and can be thus resistance spot welded to one another. As depicted in FIG. 4, the RSW joint 160 can include a portion of the mounting flange 150, the outer panel 250, the inner panel 252, and the reinforcement 254 in a single weld. However, it will be appreciated that any number (e.g., two or more) of components can be joined with one weld. In other words, multi-sheet welding can be performed to form the RSW joint 160 to include components, including but not limited to the roof panel 216, UAM interface 116, the mounting flange 150, the outer panel 250, the reinforcement section 254, the inner panel 252, etc.

Stated another way, in the depicted embodiment, the roof component 110 includes the second part 114 as section 264, which is joined to the outer panel 250 of the side panel 202 of the vehicle body component 120. The section 264 extends at least partially beneath the horizontal wall 262 of the roof panel 216 of the roof component 110. The mounting flange 150 of the roof component 110 is aligned with the mounting flange 255 of the side panel 202 and is joined or welded thereto via the RSW joint 160 during assembly of the vehicle body. As previously discussed, the roof component 110 includes the UAM interface 116 which joins two dissimilar metals, which are, for example, the aluminum roof panel 216 and the steel of section 264, thereby enabling resistance spot welding to be utilized to form the RSW joint 160, thereby joining the steel outer panel 250 and the steel section 264.

Figure 5B:
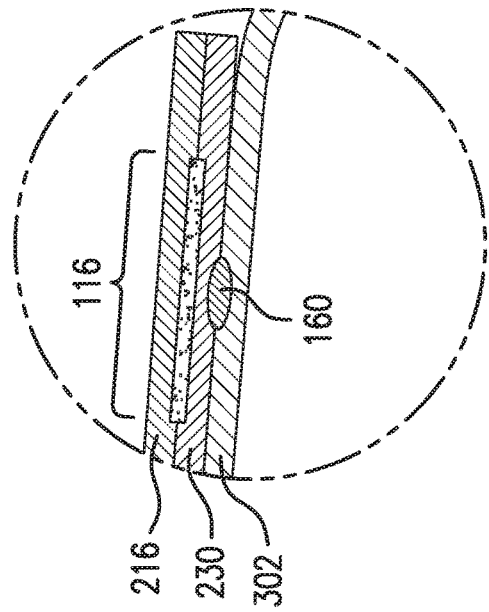
FIGS. 5A-5B are cross sectional views taken along line C-C of FIG. 2.
Figure 5A:
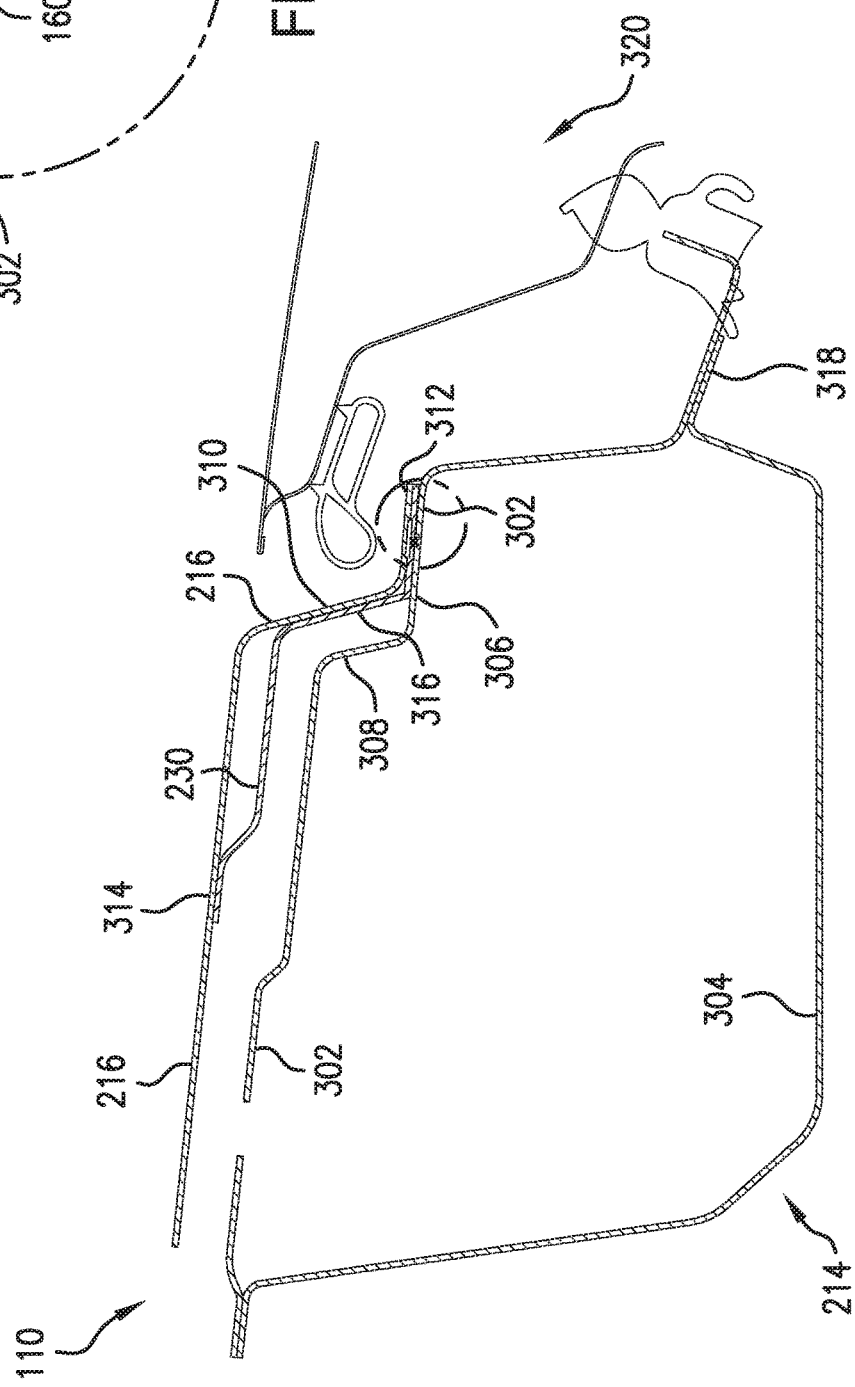

FIGS. 5A-5B are cross sectional views taken along line C-C of FIG. 2, depicting an aspect of the rear support bracket 230. The roof component 110 is joined to the rear roof rail 214 of the vehicle body component 120 via the RSW joint 160. The rear roof rail 214 includes an outer panel 302 and an inner panel 304 fixedly attached (e.g., welded) thereto. A landing 306 of the outer panel 302 defines an area to be joined by the RSW joint 160. The outer panel 302 includes a step portion 308. The roof panel 216 includes a vertical wall 310 and a horizontal wall 312. The roof panel 216 further includes a raised portion 314. In this example, the roof panel 216 is the first part 112 of the roof component 110, and the steel transition of the rear support bracket 230 is the second part 114 and is fixedly attached thereto via the UAM weld at the UAM interface 116.

A rearward end portion 316 of the rear support bracket 230 is shaped to conform to a rearward section of the roof component 110 and is fixedly attached to the vertical wall 310 of the roof panel 216. The rearward end portion 316 underlies and abuts the horizontal wall 312 and is welded to the outer panel 302 via the RSW joint 160. FIG. 5 further depicts a rear gutter 318 defined by the rear roof rail 214 and a tail gate structure 320.

Accordingly, the present disclosure provides a method of securing a roof component 110 formed of a first part 112 of aluminum or aluminum-based alloy and a second part 114 of a steel transition to a vehicle body component 120 formed of steel or a steel-based alloy. The exemplary method generally comprises joining the first part 112 to the second part 114 at a peripheral edge portion of the first part via an ultrasonic additive manufacturing (UAM) interface 116; providing the roof component 110, including the second part 114 as a mounting flange 150; providing the vehicle body component 120; electro-coating the roof component 110 and the vehicle body component 120; painting the roof component 110 and the vehicle body component 120; and resistance spot welding the roof component 110 and the vehicle body component 120 or joining the second part 114 to the vehicle body component 120 formed of the second metal via RSW.

Figure 6:
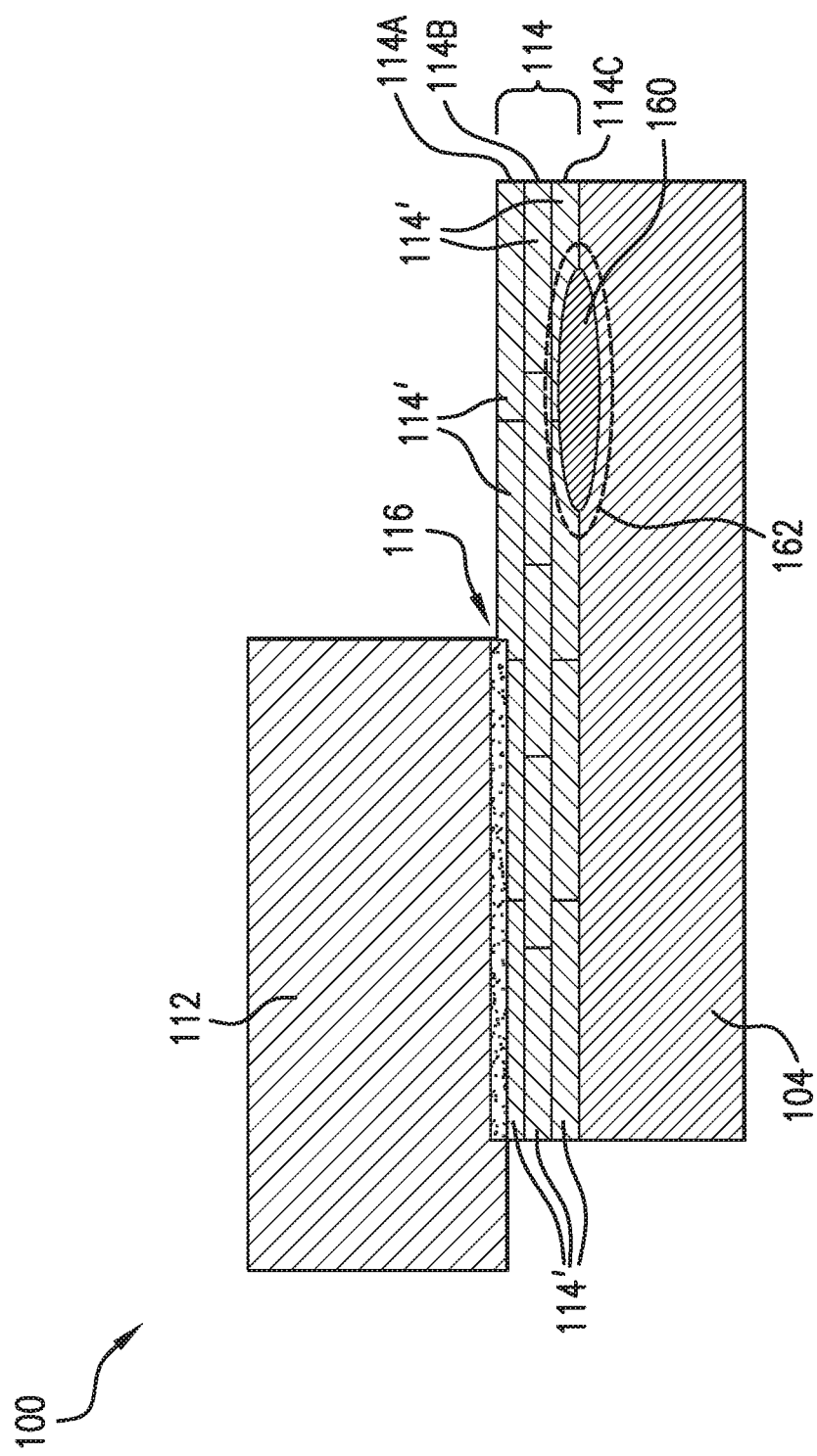
FIG. 6 is an exemplary schematic view of a vehicle body assembly.

FIG. 6 is an exemplary schematic view of the vehicle body assembly, according to another aspect. For example, in FIG. 6, the second part 114 or insert has a UAM block build configuration which includes multiple layers of UAM foil tapes 114' applied during the UAM process. For example, in FIG. 6, a first UAM layer 114A, a second UAM layer 114B, and a third UAM layer 114C are included in the second part 114 or the insert. However, more or fewer UAM layers can be utilized to build the insert to the desired thickness. Additionally, the UAM interface 116 is located at a first position and the RSW joint 160 is located at a second position which is offset from the first position in the forward and rearward direction or in the lateral direction. Because of this offset, creation of the RSW joint 160 and heat from the HAZ 162 do not impact the UAM interface 116, unlike FIG. 1, where the heat from the RSW joint 160, if enlarged to cover the area of 162, can include portions of the UAM interface 116. In other words, according to some aspects, the area of 162 can be the RSW joint rather than the area of 160.

Figure 7:
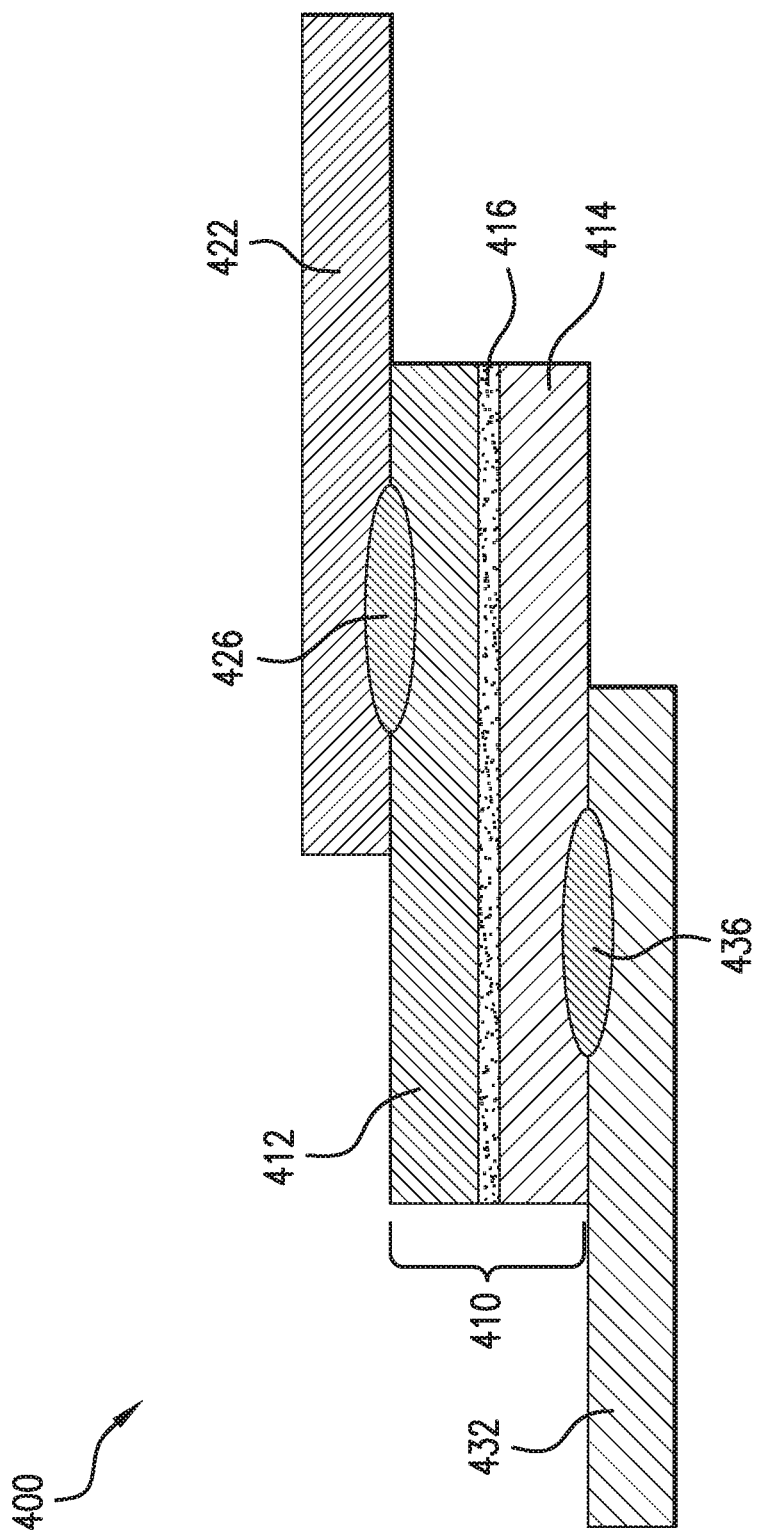
FIG. 7 is an exemplary schematic view of a vehicle body assembly.

FIG. 7 is an exemplary schematic view of a multi-material component 400, according to one aspect. The multi-material component 400 can include a bi-material structure 410 which includes a first part 412 and a second part 414 joined at a UAM interface 416. For example, the first part 412 includes a first material and the second part 414 includes a second material with is UAM weld compatible with the first material. The bi-material structure 410 is joined to a first structure 422 including the first material via an RSW joint 426. The bi-material structure 410 is also joined to a second structure 432 including the second material via an RSW joint 436. As previously discussed, the first and second materials may include steels, steel alloys, aluminum, aluminum alloys, magnesium, magnesium alloys, etc. In this regard, when one material requires more power to weld than another material, the corresponding RSW can be done first for that interface. For example, if 412 and 422 are steel and 414 and 432 are Al, RSW 426 may be formed prior to RSW 436.

Figure 8:
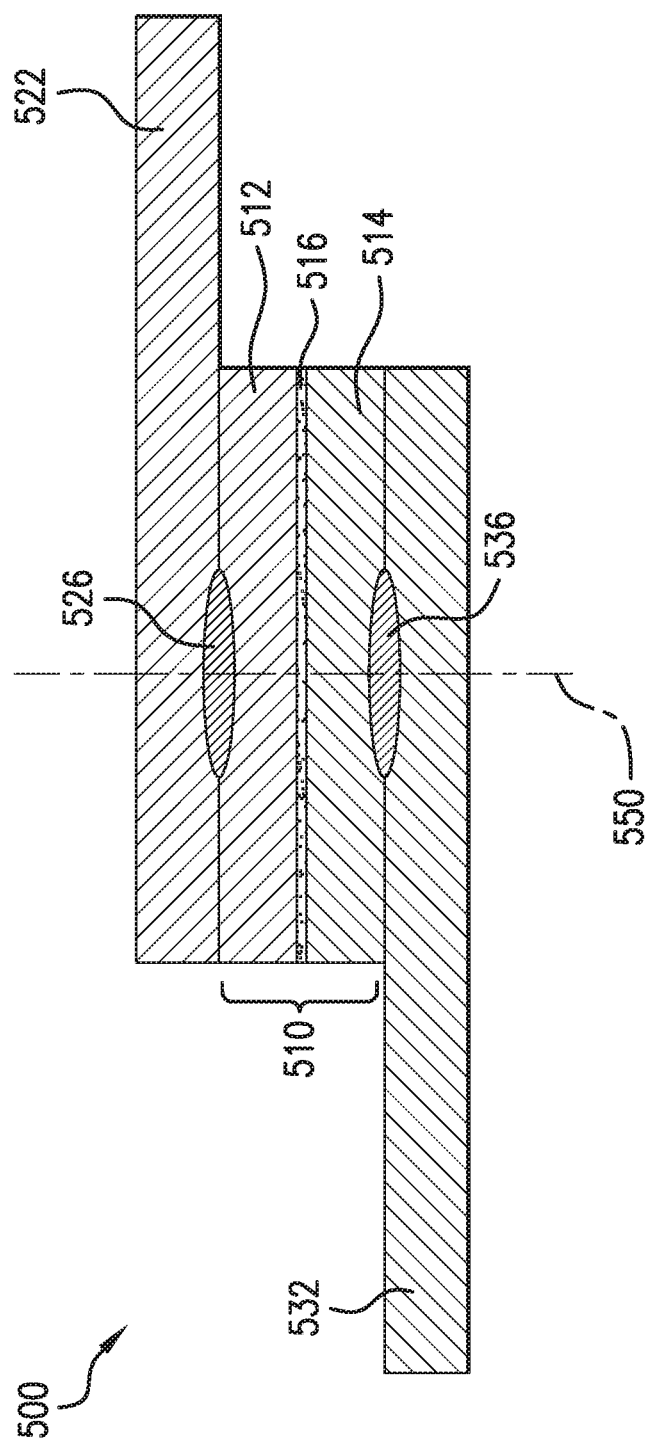
FIG. 8 is an exemplary schematic view of a vehicle body assembly.

In another example of a multi-material component 500, a first structure 522 (including a first material), a bi-material structure 510 (which includes a first part 512 including the first material and a second part 514 including a second material joined at a UAM interface 516), and a second structure 532 (including the second material) can be joined in one welding action, resulting in RSW joints 526 and 536 being collocated on a common vertical axis 550, as depicted in FIG. 8.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-material component comprising:
    a first component comprising a first material, and defining a first facet;
    a second component comprising a second material that is different than the first material, and defining a second facet; and
    an insert secured directly to the first facet of the first component with a solid-state interface, and fastened directly to the second facet of the second component, wherein the first facet of the first component and the second facet of the second component face each other; and
    wherein the first component and the second component extend outward beyond the solid state interface.

2. The multi-material component according to claim 1, wherein the insert is fastened to the second component at a position on the second component that is offset from the solid-state interface.

3. The multi-material component according to claim 1, wherein the insert is fastened to the second component by a fusion weld.

4. The multi-material component according to claim 3, wherein the solid-state interface is not within a heat affected zone of the fusion weld.

5. The multi-material component according to claim 1, wherein the first component and the second component extend outward beyond the solid state interface on two opposite sides of the solid state interface.

6. The multi-material component according to claim 1, wherein the insert comprises a plurality of ultrasonic additive manufacturing layers.

7. The multi-material component according to claim 1, wherein the solid state interface is an ultrasonic additive manufacturing interface.

8. A multi-material component comprising:
a first part comprising a first material, the first part being fastened to a first structure; and
a second part comprising a second material that is different than the first material, the second part being fastened to a second structure and being secured to the first part with a solid state interface;
wherein at least one of the following a)-d) are satisfied:
a) the first part is fastened to the first structure by a first fusion weld,
b) the second part is fastened to the second structure by a second fusion weld,
c) the first structure extends outward beyond the first part, or
d) the second structure extends outward beyond the second part.

9. The multi-material component of claim 8, wherein:
both a) and b) are satisfied; and
at least one of the first and second fusion welds are offset from the solid-state interface.

10. The multi-material component according to claim 9, wherein both c) and d) are satisfied.

11. The multi-material component according to claim 8, wherein:
both a) and b) are satisfied; and
the solid state interface is not within a heat affected zone of either of the first or second fusion welds.

12. The multi-material component according to claim 11, wherein the first and second fusions welds are each a resistance spot weld.

13. The multi-material component according to claim 8, wherein the solid state interface is an ultrasonic additive manufacturing interface.

14. The multi-material component according to claim 8, wherein:
both c) and d) are satisfied; and
at least one of the first and second structures extends outward beyond the solid-state interface on two opposite sides of the solid-state interface.

15. A method of making a multi-material component comprising:
providing a first component that includes a first part joined to an insert via a solid-state interface, the first part comprising a first material and the insert comprising a second material that is different than the first material;
coating the first component with an electro-coating or paint; and
joining a second component to the first component by securing the second component to the insert.

16. The method according to claim 15, wherein:
the second component includes the second material; and
the second component is joined to the first component by a fusion weld.

17. The method according to claim 16, wherein:
the fusion weld is a resistance spot weld having a heat affected zone; and
the solid-state interface is not within the heat affected zone.

18. The method according to claim 16, wherein:
the fusion weld is offset from the solid-state interface; and
the solid-state interface is not within a heat affected zone of the fusion weld.

19. The method according to claim 15, wherein the first component and the second component extend outward beyond the solid state interface.

20. The method according to claim 15, wherein the first component and the second component extend outward beyond the solid state interface on two opposite sides of the solid state interface.

* * * * *